US011392562B2

(12) United States Patent
Fan et al.

(10) Patent No.: US 11,392,562 B2
(45) Date of Patent: Jul. 19, 2022

(54) HYBRID CLIENT TRANSACTION MODE FOR KEY VALUE STORE

(71) Applicant: Oracle International Corporation, Redwood Shores, CA (US)

(72) Inventors: Ming Fan, Bellevue, WA (US); Daniel Ricketts, Seattle, WA (US); Benjamin Tobler, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 25 days.

(21) Appl. No.: 17/146,351

(22) Filed: Jan. 11, 2021

(65) Prior Publication Data
US 2021/0342311 A1 Nov. 4, 2021

Related U.S. Application Data

(60) Provisional application No. 63/017,557, filed on Apr. 29, 2020.

(51) Int. Cl.
G06F 7/00 (2006.01)
G06F 16/21 (2019.01)
G06F 16/23 (2019.01)
G06F 16/22 (2019.01)
G06F 16/182 (2019.01)
(Continued)

(52) U.S. Cl.
CPC ........ G06F 16/214 (2019.01); G06F 16/1767 (2019.01); G06F 16/182 (2019.01); G06F 16/1865 (2019.01); G06F 16/2282 (2019.01); G06F 16/2379 (2019.01); H04L 67/02 (2013.01); H04L 67/125 (2013.01)

(58) Field of Classification Search
CPC .. G06F 16/214; G06F 16/1767; G06F 16/182; G06F 16/1865; H04L 67/02; H04L 67/125; H04L 67/2842; H04L 67/2852
See application file for complete search history.

(56) References Cited

U.S. PATENT DOCUMENTS 7,426,559 B2 9/2008 Hamel et al.
7,490,113 B2 2/2009 Bourbonnais et al.
(Continued)

OTHER PUBLICATIONS

U.S. Appl. No. 16/922,921, Non-Final Office Action dated Sep. 30, 2021, 20 Pages.
(Continued)

Primary Examiner — Mohammed R Uddin
(74) Attorney, Agent, or Firm — Kilpatrick Townsend & Stockton LLP

(57) ABSTRACT

The present disclosure relates to a system and techniques for enabling data to be updated within a data store through concurrent operations. Embodiments of the system enables multiple client applications (e.g., implemented on a cloud platform) to update data concurrently. In some embodiments, operations may be determined to be either client-managed operations or service-managed operations. Client-managed operations may be performed by a client application, whereas the client application may pass service-managed operations to a service application. The service application may put each of the service-managed operations into a commit queue wherein each service-managed operation is committed only after the one put into the queue before it has been committed.

19 Claims, 12 Drawing Sheets

(51) Int. Cl.
*G06F 16/176* (2019.01)
*G06F 16/18* (2019.01)
*H04L 67/02* (2022.01)
*H04L 67/125* (2022.01)

(56) References Cited

U.S. PATENT DOCUMENTS

| | | | |
|---|---|---|---|
| 7,822,727 B1 | 10/2010 | Shaughnessy | |
| 8,667,330 B1* | 3/2014 | Chatterjee | G06F 11/2094 |
| | | | 707/684 |
| 9,002,802 B2 | 4/2015 | Deshmukh et al. | |
| 9,223,843 B1 | 12/2015 | Madhavarapu et al. | |
| 9,251,021 B2 | 2/2016 | Calder et al. | |
| 9,280,591 B1* | 3/2016 | Kharatishvili | G06F 16/27 |
| 9,430,274 B2 | 8/2016 | Zhang | |
| 9,552,242 B1 | 1/2017 | Leshinsky et al. | |
| 9,715,522 B2 | 7/2017 | Hirose et al. | |
| 10,664,470 B1* | 5/2020 | Forghani | G06F 16/2379 |
| 10,834,224 B2 | 11/2020 | Das | |
| 10,936,576 B2* | 3/2021 | Patel | G06F 16/252 |
| 11,288,263 B2* | 3/2022 | Mietke | G06F 16/2358 |
| 2003/0220935 A1 | 11/2003 | Vivian et al. | |
| 2011/0087633 A1 | 4/2011 | Kreuder et al. | |
| 2013/0060742 A1* | 3/2013 | Chang | G06F 16/1774 |
| | | | 707/704 |
| 2015/0261782 A1* | 9/2015 | McFerrin | G06F 3/06 |
| | | | 707/625 |
| 2016/0070589 A1* | 3/2016 | Vermeulen | G06F 9/466 |
| | | | 711/153 |
| 2018/0013692 A1* | 1/2018 | Park | H04L 67/22 |
| 2018/0260428 A1* | 9/2018 | Patel | G06F 16/2365 |
| 2019/0079834 A1 | 3/2019 | De Schrijver et al. | |
| 2020/0183892 A1* | 6/2020 | Yang | G06Q 30/0601 |
| 2021/0064602 A1* | 3/2021 | Mietke | G06F 16/2358 |
| 2022/0019568 A1* | 1/2022 | Khesin | G06F 16/22 |

OTHER PUBLICATIONS

U.S. Appl. No. 16/922,921, "Final Office Action", dated Mar. 18, 2022, 20 pages.

* cited by examiner

HYBRID CLIENT TRANSACTION MODE FOR KEY VALUE STORE

CROSS-REFERENCE TO RELATED APPLICATIONS

The present application is a non-provisional application of, and claims the benefit and priority under 35 U.S.C. 119(e) of U.S. Provisional Application No. 63/017,557, filed Apr. 29, 2020, entitled "TECHNIQUES FOR UPDATING DATA VALUES VIA HYBRID OPERATIONS," the entire contents of which are incorporated by reference for all purposes.

BACKGROUND

Cloud-based platforms have become increasingly common for end-to-end data management in database systems, such as Extract-Transform-Load (ETL) database systems. Such cloud-based platforms may offer entire suites of cloud solutions built around a customer's data. However, resource usage can be difficult to track in these cloud-based systems due to their distributed nature. Each customer of a cloud-based system may operate a number of instances (i.e., virtual server instances), each of which may utilize various resources. In such a system, each instance may record its resource usage via a database. However, this may lead to a scenario in which multiple instances using the same resources attempt to update the same rows in the database. Under lax concurrency control, updates made by multiple instances may result in inaccurate values. Under strict concurrency control, only a single instance will be able to update each row and other attempts to do so might fail, resulting in a performance bottleneck when updating the database.

BRIEF SUMMARY

Techniques are provided (e.g., a method, a system, non-transitory computer-readable medium storing code or instructions executable by one or more processors) for enabling data to be updated within a data store through concurrent operations. Various embodiments are described herein, including methods, systems, non-transitory computer-readable storage media storing programs, code, or instructions executable by one or more processors, and the like.

One embodiment is directed to a method performed by a computing instance that includes determining a transaction to be completed, the transaction comprising a set of operations, identifying, from the set of operations, a subset of client-managed operations and a subset of service-managed operations, performing each of the operations in the subset of client-managed operations, providing each of the operations in the subset of service-managed operations to a service application, wherein the service application performs each of the service-managed operations, and determining whether to commit the operations in the set of operations upon determining that all of the operations in the set of operations have been performed.

Another embodiment is directed to a computing device comprising a processor; and a memory including instructions that, when executed with the processor, cause the computing device to determine a transaction to be completed, the transaction comprising a set of operations, identify, from the set of operations, a subset of client-managed operations and a subset of service-managed operations, perform each of the operations in the subset of client-managed operations, provide each of the operations in the subset of service-managed operations to a service application, wherein the service application performs each of the service-managed operations, and determine whether to commit the operations in the set of operations upon determining that all of the operations in the set of operations have been performed.

Yet another embodiment is directed to a method performed by a service application comprising receiving a service-managed operation and at least one condition, the service managed operation comprising one of a number of operations for a transaction, retrieving a data value associated with the service managed operation from a data store, manipulating the data value based on the at least one service-managed operation, determining whether the manipulated data value meets the at least one condition, and upon determining that the manipulated data value meets the at least one condition, writing the manipulated data value back to the data store, wherein the service managed operation is not committed until all of the number of operations for the transaction are committed.

The foregoing, together with other features and embodiments will become more apparent upon referring to the following specification, claims, and accompanying drawings.

DETAILED DESCRIPTION OF THE DISCLOSURE

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and techniques for enabling data to be updated within a data store through concurrent operations. Embodiments of the system enable multiple client applications (e.g., implemented on a cloud platform) to update data concurrently. To do this, operations may be determined to be either client-managed operations or service-managed operations. Such a determination may be made based on a type of operation to be performed or a particular row or value on which the operation is to be performed. Client-managed operations may be performed by a client application as "data writes," whereas the client application may pass service-managed operations to a service application along with an indication of the data writes performed by the client application. The service application may put each of the service-managed operations into a commit queue wherein each service-managed operation is committed only after the operation put into the queue before it has been committed. In some embodiments, all operations for a single transaction, once performed, are committed via a single commit.

Figure 1:
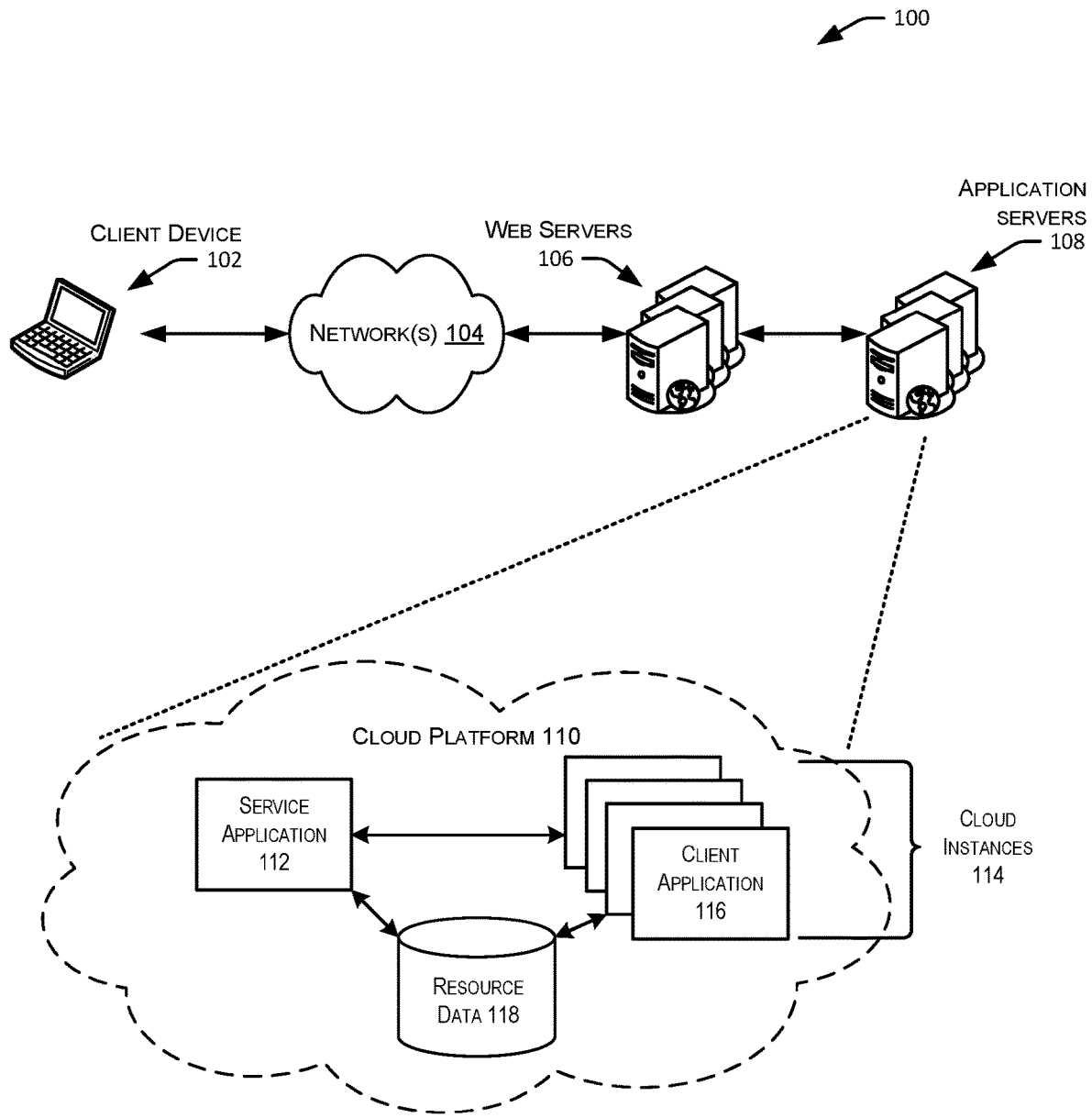
FIG. 1 depicts an illustrative system in which embodiments of the disclosure may be implemented in accordance with various embodiments.

FIG. 1 depicts an illustrative system in which embodiments of the disclosure may be implemented in accordance with various embodiments. As will be appreciated, although a Web-based environment is used for purposes of explanation, different environments may be used, as appropriate, to implement various embodiments of the illustrative system. FIG. 1 depicts an illustrative system 100 that includes at least one electronic client device 102, which can include any appropriate device operable to send and receive requests, messages or information over an appropriate network 104 and convey information back to a user of the device 102. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network may be known to one skilled in the art and will not be discussed herein in detail. Communication over the network can be enabled by wired or wireless connections and combinations thereof. In this example, the network includes the Internet, as the illustrative system includes a Web server 106 for receiving requests and serving content in response thereto, although for other networks an alternative device serving a similar purpose could be used as would be apparent to one of ordinary skill in the art.

The illustrative system includes at least one application server 108. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 102 and the application server 108, can be handled by the Web servers 106. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The illustrative system includes an environment in one embodiment that is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

The application servers 108 may implement a cloud platform 110. The cloud platform 110 may implement at least a service application 112 and a number of cloud server instances 114 each of which execute a client application 116. Additionally, the cloud platform 110 may include one or more data stores, such as resource data 118. In accordance with some embodiments, one or more additional cloud server instances 114 may be instantiated (or spun up) or shut down as the client's demand for resources changes. Each cloud service instance 114 which is instantiated executes a client application 116 associated with a client for which the cloud service instance 114 was instantiated. Each client application 116 of a cloud server instance 114 may consume resources and may record its respective usage of resources in a record of resource data 118. In certain embodiments, techniques as described herein may be implemented within the cloud platform 110 in order to prevent failures and errors that may occur during concurrent updates to resource data 118 made by the client applications 116. The resource data 118 may store information pertaining to resource usage by each client applications 116.

The illustrative system 100 may utilize at least one network 104 that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
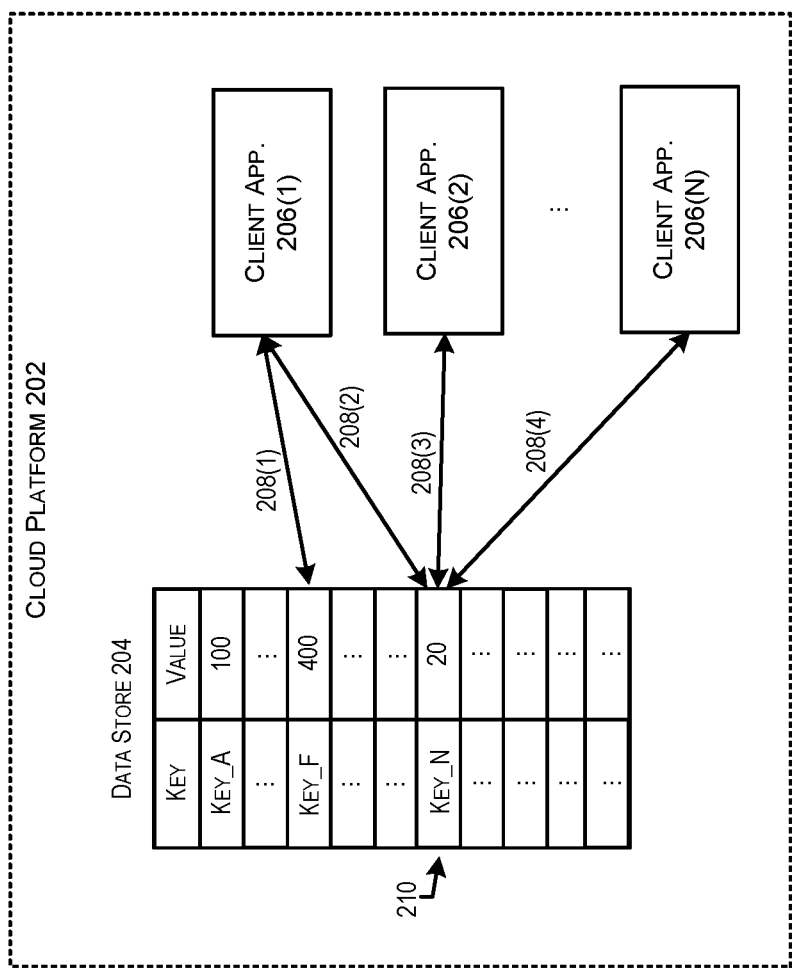
FIG. 2 depicts an example of cloud platform 202 in which client-managed operations are used to update a data store.

FIG. 2 depicts an example of cloud platform 202 in which client-managed operations are used to update a data store 204. An operation may include any retrieval and/or manipulation of data. Some examples of operations that may be performed might include getValue(s), putValue, deleteValue, rangeGetValues operations. The data store 204 may be any suitable data storage means. For example, the data store 204 may include a key value store. In cloud platform 202, a number of client applications 206 (e.g., 1-N) may attempt to update one or more records in the data store 204 in regards to transactions conducted by each of those client applications.

In the cloud platform 202, each client application 206 may attempt to perform a number of operations 208 on data store 204 for each transaction that it conducts. When performing an operation 208, the client application 206 identifies a record of the data store 204 pertaining to the operation, retrieves a data value in that record, updates the data value based on the conducted transaction, and writes the updated value back to the record in the data store. In some cases, multiple client applications 206 may attempt to perform an operation with respect to a single row 210 concurrently. In some cases, this may cause one or more operations 208 to fail due to strict concurrency control. When such an operation fails, the entire transaction conducted by the client application that includes that operation may also fail.

Figure 3:
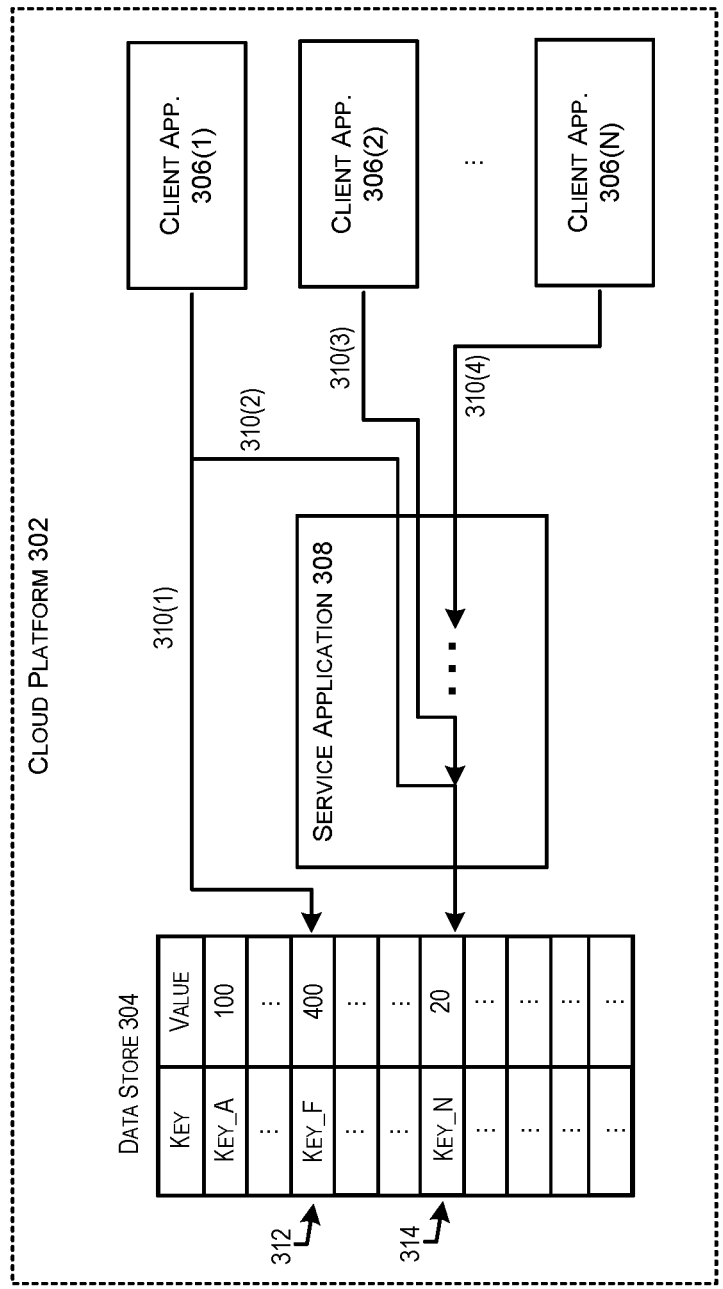
FIG. 3 depicts an example of a cloud platform 302 in which both client-managed and service-managed operations are used to update a data store 304 in accordance with embodiments of the disclosure.

FIG. 3 depicts an example of a cloud platform 302 in which both client-managed and service-managed operations are used to update a data store 304 in accordance with embodiments of the disclosure. Cloud platform 302 may include multiple client applications 306 (e.g., 1-N) as well as a service application 308, which is operated on behalf of an operator of the cloud platform 302.

In cloud platform 302, a number of the client applications 306 may attempt to update one or more records in the data store 304 in regards to transactions conducted by each of those client applications. The cloud platform 302 may maintain a list of service-managed operations and/or a list of client-managed operations. In some embodiments, the cloud platform 302 may maintain a list of service-managed rows and/or a list of client-managed rows. For each operation to be performed by a client application, the client application may determine whether the operation is a client-managed operation or a service-managed operation based on an operation type and/or a row upon which the operation is to be performed. In some embodiments, if the operation is not specifically listed as being an operation of a particular type, then the operation may be assumed to be of the opposite type. For example, if an operation to be performed by a client application is not listed in a list of service-managed operations, and not being performed on a service-managed row/value, then the operation may be determined to be a client-managed operation.

In some embodiments, the data store 304 may be configured such that each row has stored different data types. For example, data store 304 may be a key-value data store. A key-value store (a.k.a. a key-value database, dictionary, or hash table) is a data storage paradigm designed for storing, retrieving, and managing associative arrays. Key-value stores contain a collection of objects, or records, which in turn have many different fields within them, each containing data. These records are stored and retrieved using a key that uniquely identifies the record, and is used to find the data within the database. Unlike relational databases, fields in a key-value data store are not restricted to a defined type. For this reason, each row within a key-value data store may include vastly different types of data. Because of this, certain rows in a key-value store may be client-managed rows and other rows may be service-managed rows based on the different data stored in the respective rows. For the purposes of this disclosure, client-managed rows are rows of the data store 304 on which operations may be performed by a client application 306 and service-managed rows are rows of the data store 304 on which operations may not be performed by a client application 306. In some embodiments, a client application 306 has no visibility (ability to read, write, etc.) of data values in a service-managed row. In such embodiments, client applications may only obtain a reference to the service-managed row and mutations (e.g., updates) can only be made to a service-managed row by a service application (i.e., not by a client application). Additionally, particular data values (or types of data values) within a particular row may be a service-managed value, in that the data value itself cannot be updated by a client application.

The cloud platform 302 is a hybrid cloud platform in which both client-managed operations and service-managed operations are performed. In the cloud platform 302, each of many client applications 306 may conduct a transaction that involves multiple operations 310. Some of the operations involved in the transaction may be client-managed operations and other operations involved in the transaction may be service-managed operations. To complete the transaction, the client application may perform each of the client-managed operations and send each of the service-managed applications to a service application 308 to be performed. In some embodiments, the service-managed operations may be associated with conditions, such that the client application may provide one or more conditions to the service application 308 along with a corresponding operation to be performed. If any conditions are not satisfied for a single operation, the entire transaction may fail and no operations performed for the transaction are committed.

In cloud platform 302, a service application 308 receives an indication of an service-managed operation to be performed from a client application. Additionally, the service application 308 may receive a reference to a data field or row to be updated during the service-managed operation. A reference to a data field may be any suitable indicator that may be used to identify the data field to be updated. For example, a key used to identify a row in a key-value data store might be an example of such a reference. In some embodiments, the service application 308 may also receive one or more conditions associated with the service-managed operation. Upon receiving the service-managed operation, the service application 308 may place the service-managed operation into a queue of service-managed operations which each impact a particular row or value, such that each operation in the queue can only be committed once the operation in the queue before it has been committed. During performance of an operation, the service application 308 may perform a read of an uncommitted value for the referenced data field (typically referred to as a "dirty read") and may update the data field in accordance with the operation. The service application 308 may then determine whether the resulting value for the referenced data field is in compliance with the one or more conditions. If the resulting value for the referenced data field is in compliance with the one or more conditions (and provided that no other conditions have been failed), then the operation is committed at the same time as all other operations for a particular transaction (both client-managed operations and service-managed operations) concurrently (e.g., at roughly the same time) once the previous operation in the queue has been committed.

It should be noted that while a single transaction may include operations which impact separate rows, within the transaction, a particular row can only be used by either a service-managed operation, or a client-managed operation. This means that a transaction may be failed automatically if any row is touched by both a service application 308 and a client application 306 concurrently.

By way of illustrating interactions of the cloud platform 302, consider a scenario in which a client application 306(1) conducts a transaction that involves both a client-managed operation 310(1) pertaining to a row 312 of data store 304 and a service-managed operation 310(2) pertaining to a row 314 of data store 304. The client application 306(1) may determine that the operation 310(2) is a service-managed operation by virtue of the operation being of an operation type which is listed as being a service-managed operation by the cloud platform 302.

In this scenario, the client application 306 reads the data value stored at row 312 of the data store 304, performs the operation 310(1) on the retrieved data value to generate an updated data value, and writes the updated data value back row 312 (though the data value remains uncommitted). However, the updated data value written to row 312 is not yet committed.

Continuing with this scenario, the client application 306 provides the operation 310(2) to a service application 308 to be performed by that service application along with an indication of a data write resulting from the operation 310(1) performed by the client application. Additionally, the client application 306 may identify one or more conditions associated with operation 310(2) and may provide those one or more conditions to the service application 308. For the purposes of illustration, consider in this scenario that the operation 310(2) is an increment operation and the one or more conditions limits the impacted data value to 100 or less. The service application, when performing the operation, reads the data value stored at row 314 of the data store 304, performs the operation 310(2) on the retrieved data value by incrementing that data value, determines whether the incremented data value is 100 or less (in accordance with the provided conditions), and writes the incremented data value back row 314. However, the updated data value written to row 314 is not yet committed unless all of the operations in the transaction (e.g., both 310(1) and 310(2) in this case) have been successfully written. Once all of the operations for the transaction have been successfully performed, each of those operations 310(1) and 310(2) are committed via a single commit.

In this scenario, when the service-managed operation 310(2) is received by the service application 308, the service-managed operation 310(2) is placed in a queue (e.g., a commit queue) and processed in the order in which it is received. Such a queue may be row or value specific, in that separate queues are maintained with respect to each row or value. For example, assume that another client applications 306(2) provides service-managed operation 310(3) to the service application shortly after operation 310(2) has been provided to the service application (but before operation 310(2) has been committed) and that both service-managed operation 310(3) and service-managed operation 310(2) impact the same row/value. In this scenario, service-managed operation 310(3) will be added to a queue behind service-managed operation 310(2), such that service-managed operation 310(3) cannot be committed until service-managed operation 310(2) has been committed. In some embodiments, the service application 308 may perform operation 310(3) after the operation 310(2) has been performed but before the operation 310(2) has been committed. To do this, the service application may perform a dirty read (i.e., a read of an uncommitted value) to perform the operation 310(3). However, the operation 310(3) will have to be repeated using a different value if the operation 310(2) eventually fails. Note that if any operation in a transaction fails, the entire transaction may fail. In some embodiments, a commit to data store 304 may only be performed by a service application. Hence, even if a transaction includes only client-managed operations, while they may be performed by a client application, an indication of a data write resulting from the operations may be provided to a service application, which may then commit the data write to the data store 304.

Figure 4:
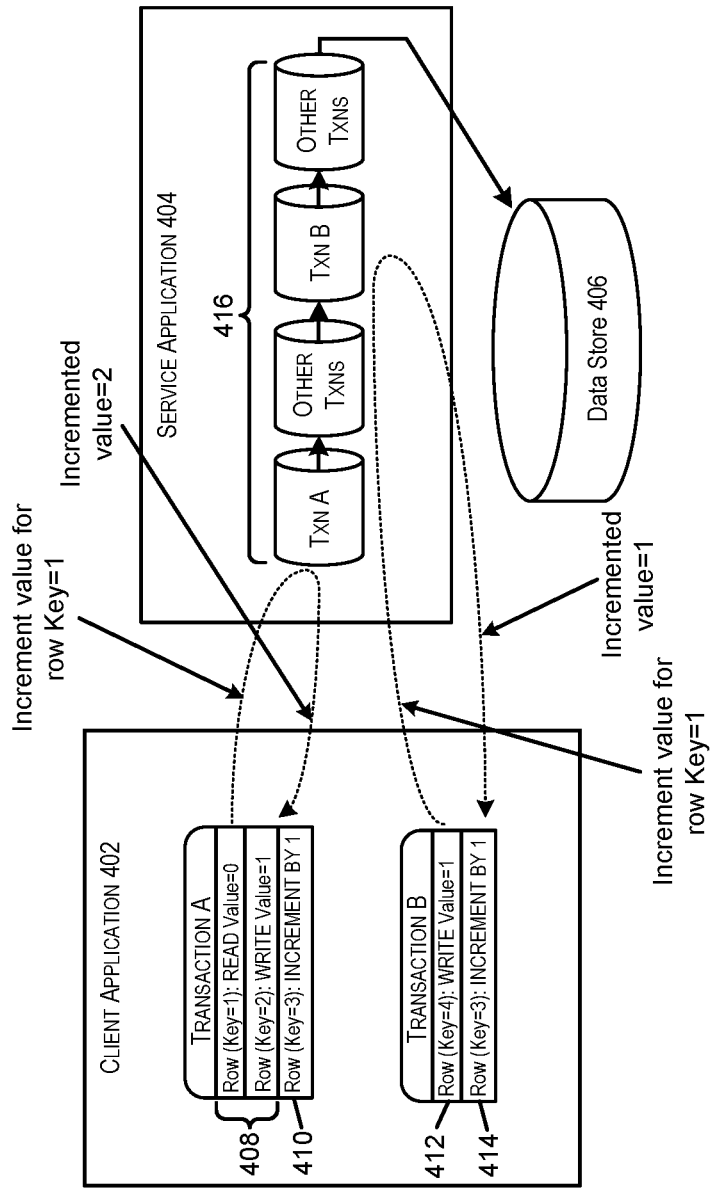
FIG. 4 depicts a diagram illustrating the performance of concurrent operations in accordance with at least some embodiments.

FIG. 4 depicts a diagram illustrating the performance of concurrent operations in accordance with at least some embodiments. More particularly, FIG. 4 depicts concurrent transactions (transaction A and transaction B) performed by one or more client applications 402 with a service application 404. Each of the transactions involve manipulation of data within a data store 406.

In the depicted diagram, two separate transactions (A and B) are shown. For illustrative purposes, consider that each of transaction A and transaction B may have mixed client-managed and service-managed operations against disjoined rows. For example, consider that transaction A includes operations 408, which are client-managed operations, as well as operation 410, which is a service-managed operation. Additionally, consider that transaction B includes operation 412, which is a client-managed operation, as well as operation 414, which is a service-managed operation. Note that both transactions in this scenario are incrementing the same row with key=3 (operations 410 and 414). Assume that the value of key=3 was initialized as 0 prior to receiving either of transaction A or transaction B. Note that each of operations 408 and 412 may be performed by the client application 402, while remaining uncommitted, such that an indication of a data write is passed to the service application along with each transaction.

As two transactions are concurrently provided to a service application, the service application places each of them into a commit queue 416. In some embodiments, the commit queue 416 may be a serialized commit queue. Assume, for this scenario, that transaction B is received before transaction A. When the service application reaches transaction B in the commit queue 416, the service application queries the data store 406 and finds the value is 0 for key=3. The service application then executes an increment operation to set the value for key=3 to 1. Data store 406 will have a state {{key=3, value=1}, {key=4, value=1}}, if transaction B is able to be successfully committed.

When the service application reaches transaction A in the commit queue 416, the service application queries and finds the value is 1 for key=3, since this is the value modified by earlier transaction B. The service application then executes an increment operation to set the value for key=3 to 2. If transaction A is able to be successfully committed, the value key=3 should be 2. As illustrated above, although each of transaction A and transaction B were received concurrently, and although each of the transactions touches the same row (key=3), neither of the transactions fails.

Figure 5:
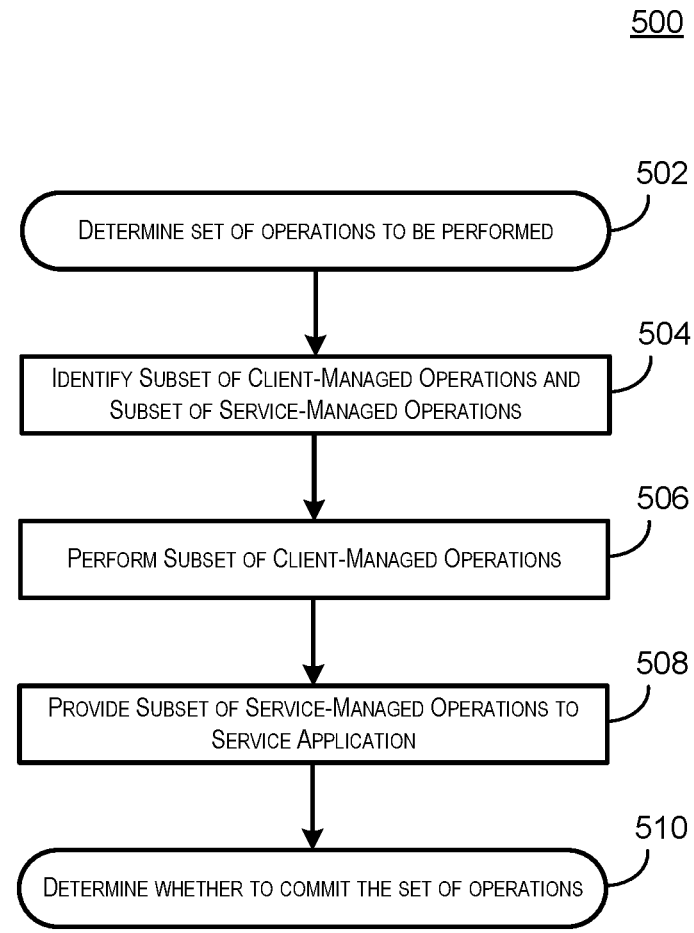
FIG. 5 depicts a flow diagram illustrating an example process for performing operations of a transaction in accordance with embodiments.

FIG. 5 depicts a flow diagram illustrating an example process for performing operations of a transaction in accordance with embodiments. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by one or more elements of the cloud platform 110 shown in FIG. 1. For example, the process 500 may be performed by the cloud computing instance 114 implemented on one of a number of distributed computing devices in a cloud platform 110 which includes a client application 116. The code may be stored on a computer-readable storage medium, for example, in the form of a computer program including a plurality of instructions executable by one or more processors. The computer-readable storage medium may be non-transitory.

Process 500 begins at 502 when a cloud computing instance determines a set of operations to be performed. The cloud computing instance may include a client application which conducts transactions on behalf of a client. The set of operations may relate to a transaction to be conducted. The set of operations may include both client-managed operations and service-managed operations. Each of the operations may pertain to updates to be made to a data value in a data store. In some embodiments, the data store is a key value store. At 504, the process 500 involves identifying a subset of client-managed operations and a subset of service-managed operations from the set of operations.

At 506, the process 500 involves performing each of the operations in the subset of client-managed operations. Performing each of the operations in the subset of client-managed operations may involve updating at least one value in a data store as a data write. Updating such a value may further involve retrieving the value from the data store, updating that value based on the operation in the subset of client-managed operations, and writing the updated value back to the data store. Note that the data write including the updated data value may not be committed to the data store at this time. Instead, an indication of the data write is passed to the service application, potentially along with the subset of service-managed operations at 508 below.

At 508, the process 500 involves providing the subset of service-managed operations to a service application to be performed. This may involve providing, to the service application, a reference to a data value in a data store and an indication of one or more actions to be performed with respect to the data value. The reference to the data value may be a key identifier. Each of the subset of service-managed operations are placed into a queue by the service application. Such a queue includes service-managed operations received from a number of different computing instances. The service-managed operations in the queue are processed by the service application in the order in which the service-managed operations were received. In some embodiments, the queue may be specific to service-managed operations which impact a particular row of a data store. In some embodiments, the process 500 further involves providing one or more conditions associated with the service-managed operations to the service application. For example, conditions may include a maximum or minimum value. In these embodiments, the service-managed are not committed upon determining that at least one of the one or more conditions have not been met. For example, if the update to the data value would be greater than a maximum value or less than a minimum value.

At 510, the process 500 involves determining whether to commit each of the performed operations. In some embodiments, all of the operations for the transaction, including both the client-managed operations and the service-managed operation may be committed within a single commit. In some embodiments, a commit is performed only if all of the operations were successful.

Exemplary Implementations 1

As uncompromised theory of serializable isolation, an embodiment should only let one transaction to be committed if multiple transactions are touching the same key (either hash-range value or secondary index value). However, this creates a bottleneck for the below scenarios:

1. Usage tracking (or counter) problem: Most control plane team needs to track usage of a given resource to ensure customers won't reach provision limit or quota, like compute may need to track usage to enforce quota on cores, shapes, or instances. However, due to strict concurrency control, an embodiment only allow one resource to be created/deleted when increasing or decreasing a usage counter, and all other concurrent resource provision or termination will be rejected. This becomes a significant performance bottleneck for the control plane.
2. Bitmap operations: Aa virtual cloud network uses a bitmap to manage states of slots for given machine instances: 1 or 0. Due to an embodiment concurrency control, a virtual cloud network has to attach or detach one slot for a given instance at the same time as provision or termination. Parallel transactions for attach or detach will be conflicted because they are touching the same embodiment row.

In the above scenario for a control plane, there will be a huge effort for each application to implement a targeted workaround individually. As a control plane foundation, an embodiment needs to have some better way to resolve this gracefully.

Consider an illustrative example of usage tracking and quota enforcement, in order to have a better understanding the problem to be resolved. Assume the system has a bucket named as Counters in an embodiment to track how many cloud instances are instantiated per tenant name. The bucket has a simple schema with:

tenant name as key
count as value

| tenant name | count |
|---|---|
| Tenant_1 | 100 |
| Tenant_2 | 20 |
| Tenant_3 | 3000 |

There's below pseudo code to track usage when successfully provisioned an instance:

In the example shown above, when an instance is provisioned or terminated, the tracking usage for the parent tenant in the Counter bucket needs to be updated. When multiple instances are being created at the same time under the same tenant name, only one will succeed. All others will be rejected because of commit conflict on the same Counter row.

In this disclosure, a Service Managed Data Operation is provided to resolve above problems, which is targeted to:

A solution to avoid rejections when conflict happens on a given critical point.
Zero migration effort for existing customer, on schema, data movement or deployment.
Compatible with existing behavior of commit.
Additive client API change to minimize code change.

Before stepping into the solution, it may be helpful to discuss what is expected behavior for a customer in the above example.

At present, an embodiment uses interactive (e.g., client-managed) transaction semantics. Application can embed complex client logic within a transaction scope, which provides a user-friendly and flexible interface. Repeatable read ensures the read data within the transaction is consistent. To improve throughput, optimistic concurrency control (OCC) is used to ensure multiple transactions can complete without interfering with each other. However, OCC will reject the whole transaction when even a single conflict occurs. This mechanism defends correctness, but sometimes may be too heavy for above mentioned scenarios.

Some transaction systems (e.g., dynamoDB transactions), uses non-interactive (e.g., service-managed) transaction semantics. Application can only send transactions with some SQL-like query commands to the database, while it won't be able to read or consume values within application transaction scope. Transaction semantics like this support atomic in place operations to be executed on the service side, while the client application is not able to consume read value within the transaction.

The above interactive-semantics may introduce much higher conflict in a highly concurrent/distributed environment, because the client manages all variants of transaction scope and data mutations. It has been observed that some such transactions take more than 20 minutes in a client application, from begin to commit. On the contrary, non-interactive transaction usually do a better job of concurrency control, because all transaction lifecycles are maintained on the service side, and they are managed more efficiently.

In this disclosure, in order to resolve the earlier problem statement (usage tracking or bitmap), embodiments may allow service applications to handle a part of data using non-interactive semantics with limited supported operations.

```
try (Transaction txn = ds.beginTransaction("On instance provisioned")) {
    // Update the instance state to AVAILABLE
    CounterDO fetched = counterBucket.get(tenantName); // tenant name can be
"Tenant_3", "Tenant_2", ...
    int newUsage = fetched.getCount( ) + 1;    // increment
    if (newUsage <= desiredQuota) {
        CounterDO updated = fetched.toBuilder( ).setCount(newUsage).build( );
        counterBucket.set(updated);
        // commit! but it may conflict with provision of other new instances,
        // because they attempted to update the same row in Counter bucket.
        txn.commit( );
    }
    // otherwise, abort txn.
}
```

The term service-managed is used herein to define objects and operations that can be only executed in service side (e.g., by a service application), as part of transactions.

For purposes of illustration, consider a scenario in which one transaction is allowed to touch multiple rows scattered across different buckets. We are dividing those data into two subsets:

Client-managed rows: these are rows that are touched by client application read rows and writes within the transaction, using the transactional get( ) or put( ) API. A client application manages a lifecycle of this data, for example, it defines when to read or write, and manage read/write values interactively.

Service-managed rows: these are rows that can only be referenced in a client application transaction. The client application has no visibility of actual values of rows. It cannot consume value of rows, though it may mutate the value of a row by asking the service application to perform some allowed service-managed operations.

On top of rows, an embodiment will allow a client application to request a specified mutation on a value of service-managed rows. Thus the below terms will apply to at least some embodiments:

Service-managed Value: a given column of service-managed rows. This is a basic unit of operations that can be executed on a service side. A guarded column can be identified by having an element of: bucket name or id, value of hash-range-key and name of column.

Service-managed operation: an operation that can only be executed on service side (e.g., by a service application). In some embodiments, a service-managed operation can only be applied to column level. Certain embodiments may restrict an operation to be executed on the service side from being included on a top row level.

Returning to the above-noted problem, the above operations are used to address that problem, in that:

Usage Tracking: Instead of using client-managed operation (Read→count++→Write), a client application can send a managed operation to tell an embodiment:

please increment value of counter column for given row, e.g., tenant=Tenant_2 please reject the commit if the value is beyond the limit

Bitmap flipping: the client application can send an guarded operation to tell an embodiment:

Please flip given bit of a column value: 1→0 or 0→1, (e.g., #30th bit of column value).

Please reject the commit if the flipped bit is not as expected (e.g. conditions are not met).

Targeting the above scenarios, the below service-managed operations are introduced:

Increment: increment a numeric value of a given column. Negative is allowed to support decrement.

BitFlip: flip bit at specific position of BLOB-type column.

Commit guard: reject or accept commit given specified condition on one or more service-managed values, within the transaction.

Here's pseudo code on how service-managed operation applies to the above scenario

```
try (Transaction txn = ds.beginTransaction("On instance provisioned")) {
    // Update the instance state to AVAILABLE
    // End of compute business logic.
    // defines counter of column "count". This value will be managed in A
embodiment service side;
        IntRef countRef = countBucket.getValueReference(txn, tenantName, "count");
        // tells A embodiment to increment by 1 in service side.
        countRef.incrementBy(1);
        // defines commit guard: accept if incremented value is LE than quota.
    txn.addCommitCondition(countRef.isLessOrEqualThan(desiredQuota);
        txn.commit( );
}
```

In the above example, the client application can only get a handle or reference of service-managed row for operation. The client application needs to provide the operation and condition against the reference without knowing the actual value. A service application will perform mutations on service-managed values at the commit time in service side.

The above concept can also be applied to a virtual cloud network's case to handle bitmap:

```
try (Transaction txn = ds.beginTransaction("Attache one cloud instance")) {
    // Update the instance state to AVAILABLE
    // defines reference of the 30's bit of binary column "vnicSlots";
    BitRef bitRef = bucket.getValueReference(txn, tenantName, "vnicSlots", 30);
    // Ask A embodiment to flip the bit in service side, could be 0->1 or 1->0
    bitRef.flip( );
        // defines commit guard: accept if flipped bit is 1.
    txn.addCommitCondition(countRef.isBitSet( ));
        txn.commit( );
}
```

Next, we discuss service-managed operations. In contrast to a client-managed operation, which follows optimistic concurrency control behavior, a service-managed operation exhibits characteristics of pessimistic lock. To manage true-serializability, when performing a service-managed operation on a row, other transactions which are making the same modification will be blocked instead of rejected. Thus, the system (on the service side) will move this service-managed operation in serialized critical section to block others. Depending on implementation, this serializability can be optimized to block operations on same row instead of global transaction queue.

For a transaction with a service-managed operation, an embodiment client will submit a payload with structured managed operations semantics, for example:

```
{
    .... // Other commit payload
    managedOperations: [
        { bucketId: 1000, key: {...}, column: c1, incrementBy: 1}
        { bucketId: 1001, ......}
    ]
    guards: [
        { bucketId: 1000, key: {...}, type: "LE", value: 10}
    ]
}
```

This payload will be put into an embodiment commit queue.

To apply a service-managed operation, the embodiment should make a critical section for each managed row and make sure only one modification can be done at one time. The modification steps are:

1. Read the row according to the key
2. Do operation on value of column, (e.g., increment/decrement/flipBit, etc).
3. Write the updated value
4. Check if the updated value meets conditions, and if not, throw ConditionNotMetException, otherwise, commit.

One potential, but maybe unoptimized, implementation is a platform that can do the above steps using a serializable block in final commit. There might be some optimization can be done to reduce database roundtrip of reading values, and conditionally parallelize step 1~3. Such optimization won't be discussed in this document. Transaction with service-managed operation cannot be squeezed with other adjacent transactions as batch, because we don't want to reject all transactions in batch if one managed transaction doesn't meet condition.

Embodiments of the disclosure reduce unexpected race condition between concurrent transaction commits. Meanwhile, it is very important the feature is safe in a highly concurrent environment. It should comply with existing embodiment commit conflict guarantee.

Embodiments may write transactions containing both service and client managed operations. For safety purpose, within the transaction, a row can only be used exclusively by either service managed operation, or client managed operation. This means, transaction should fail if any row is touched both by existing read/write APIs, like classic getValue(s), putValue, deleteValue, rangeGetValues, and vice versa.

The underlying explanation here is that, transaction APIs may assume all read or write operations are against a snapshot as of a time when the transaction begins. The value of rows won't change during the client transaction lifecycle. However, a value of a service managed column will not maintain the same invariant in such a client transaction scope. The actual value of a service managed column may change. Serializability for a service managed operation remains stable when executed on service side.

A race condition could happen for service and client transactions in different concurrent transactions, where they may touch the same row in different ways. The below grid is provided to explain what would happen for two concurrent transactions: TA and TB

|  | TA: Service managed operation | TA: Client managed operation |
|---|---|---|
| TB: Service managed operation | TA commits, TB commits | TA fails, B commits |
| TB: Client managed operation | TA commits, TB fails | Only one of TA or TB commits, the other one fails |

A summary of above table is:
  Service managed operation won't fail in any concurrent transactions. (Though it may fail due to commit guard, this is not the race condition scenario)
  Client managed operation will fail if a touched row was written by service-managed operation in another transaction.
  Client managed operation will fail if a touched row was touched by another client-managed operation. This is where we have high commit conflict rate in usage tracking scenario.

A row touched by service-managed operations may have one or more secondary index. Here's how we deal with indexes:
  For safety, we would not allow service-managed operation applied to any column that is part of any index.
  For liveless, a secondary index is allow by rows touched by service-managed operation, as long as column of index is not touched by service-managed operation.

The underlying support of the above property is, a managed operation on top of column value should not change state of transaction:
  If column value is part of index, commit of service managed operation will change value of index, which changes transaction state. This will break concurrency protocol mentioned in earlier sections.
  If the row contains secondary index, but operation has not touched them, then commit of service managed operation won't change transaction state. This commit is not interfered with other concurrent commits.

The above description explains how the use of service managed operations can resolve the counter problem. Meanwhile, one may need to consider migration problem for customers for which their applications are using code to manage counters or bitmaps in legacy way. As described below, the embodiments of the disclosure can support existing customer scenarios with minimal effort to migrate. The migration effort means:
  Data or schema migration: with current proposal, customer won't need to any data migration or schema update.
  Migration process: customer can do one deployment pass from existing code without multi-phase deployment.
  Code Migration: the design propose additive-only an opt-in interface change, which means customer won't need to refactor existing code to adopt the new feature.

For purposes of illustration, consider a scenario in which a customer has two versions of code:

• V1: old version, by reading and modifying counters using get( ) and set( ) API, as below pseudo code
  beginTx;
    count = bucket.get(key);
    if (count >= limit) {
      abortTx
    }
    bucket.set(count++);

-continued

```
    commitTx;
  end;
• V2: new version, using incrementBy+commitIf
  beginTx;
    countRef = bucket.getValueReference(key);
    txn.addCommitCondition(countRef.incrementBy(1).
    isLessOrEqualThan(limit));
    commit( )
  end;
```

When doing a deployment for V2 from V1, at some moments, customer's application will see both versions of transactions are committing at the same time. But the race condition is safe as we discussed earlier:
  V1 transaction won't commit if any other transaction, either V1 or V2, changed value during its life cycle.
  V2 transaction will commit any way because its state is protected in critical section.
This also introduces an interesting fairness problem in the concurrent system. It will be obvious above competitions are not fair to different versions. Service managed operation is taking advantage. This may happen when application is doing deployment to upgrade code from client-managed to service-managed operations. Depends on application requirements and runtime scenario, it may or may not be a problem. Application that is aware of this may need a dynamic switch when adopting the feature to shorten such transition window.

However, there are also scenarios in which an application cannot migrate existing logic to service managed operations. As mentioned earlier, the actual value of service managed column may change during the transaction scope. That's being said, if current application has logic to reference a column value with client-managed operation, they are not allowed to use managed operations. A embodiment application may have explicit or implicit reference on a read value. Some pseudocode that demonstrates an explicit reference is:

```
beginTx;
    row1 = bucket.getValue(tx, key);
    row2 = bucket2.getValue(tx, row1.Value); // You cannot change
row1 to managed operation, because row2 is using row1.
    // ...
    tx.commit( );
end;
```

In above case, conceptually we cannot change row1 to any managed operation, because row2 is using value of row 1. In our design, the system may not expose the value of managed row so this is prohibited in SDK level.

Some pseudocode that demonstrates an implicit reference is:

```
beginTx;
    row1 = bucket.getValue(tx, key);
    if (row1.Value < 10) {
        bucket2.putValue(tx, new Row2( )); // This is an implicit
        reference on row1 tx.commit( );
    } else {
        throw;
    }
end;
```

In above case, though row1 was not explicitly consumed in read or write API, but the write of bucket2 is still relying on an assumed value in row 1, which may change within transaction if converting to a managed operation.

Overall, it may be important for the application to analysis its transaction, to ensure rows that are to be managed should be isolated with other logic within the same transaction, without any explicit and implicit reference.

Additionally, embodiments of the disclosure may have certain limitations. For example, transactions with service-managed operation may slow down commit due to:
  It introduces another serialization point in commit with blocking wait. Depending on the implementation, it may require kind of read within critical section.
  Transaction with service-managed operation cannot optimize IO using batch commit.
  One could restrict count of managed rows into a reasonable value, for example, as part of read/write cardinality, or a separate limit. (note that a customer may manage multiple column values of the same row, which won't break the limit)

Additionally, an indexed column cannot be service-managed. In best practice, count column should not be part of index for most usage tracking scenarios, because those count values are low cardinality, which may cause high conflict by committing the same count value. Within a service-managed operation, this may be enforced to avoid violating such recommended practice.

Additionally, Read may be forbidden for client-managed rows. As mentioned in the conflict scenario above, the system may not allow any read in a transaction that contains client-managed operation in the same row. The result that was read will not exhibit repeated read or snapshot isolation, because it may eventually be modified by commit on service-managed operation. Consuming such read value may cause correctness issue.

Embodiments may be implemented on top of parallel commit, but it would be very complex and hard to make it correct. Platform designed and implemented a general quota management SDK on top of an embodiment, to enforce usage/quota on a compartment tree. This solution also potentially has the similar bottleneck when involved embodiment transactions have contention on the same compartment. One need not expect a service-managed operation to insert or initialize a value when a target row not present. It requires application to ensure the row is present.

Exemplary Implementations 2

Embodiments may implement a snapshot isolation using MVCC (Multi-Version Concurrency Control) theory. An embodiment uses an Oracle database as a backend storage and query engine. Like standard implementation of MVCC, an embodiment keeps a MVCC history of each bucket, stored in individual oracle table. With a historical version stored, an embodiment can read or scan any allowed version number as long as the version has not been trimmed by garbage collection.

As in MVCC theory, write (including upsert and delete) is an append only operation. Currently, a write is optimized by an append only operation, and high throughput of write may be achieved by leveraging in-memory cache, streaming processing and batching.

However, with existing data models, an embodiment has to create very complex database queries in order to compute a read snapshot and perform sorting on top of the snapshot. The query itself may be costly on the database central processing units (CPU) and input/output (IO). Furthermore, a scan query on an existing data model may be very fragile and may exhibit a large variation or non-linear degrade on performance depending on data volume, distribution, and input parameters.

Meanwhile, in order to avoid infinite growth of bucket data, an embodiment may collect old historical versioned rows. This process is called garbage collection, which may be expensive.

Here's an example implemented on virtual cloud network (VCN) database sessions in IAD, which represents CPU consumption VCN in IAD regional consumes 16% session resources in hosting CDB.

Within VCN PDB, 50%~60% sessions are used for an embodiment read

An embodiment garbage collector always consumes 10~20% sessions.

Commits take 1% sessions

Embodiments as described herein resolve problems with:

Read/Scan stability and scaling

Outage during database patching

Cost reduction on database

More particularly, disclosed herein is a new data model with the below goals:

Reduce complexity on read, which drive for predictable performance and reduction on read cost Significantly reduce cost of garbage collection by converting to data retention model.

New failover mode to be immutable with database planned patching.

Abstract data model, decoupled with storage/query engine, so that it can be easily implemented and migrated between different platforms.

Extensible for additional features on top of proposed new an embodiment mode:

Improve schema control operations in an embodiment.

Able to scaling out an embodiment read by expanding replicas. Ready for provision throughput model.

Support seamless data migration, and extensible for future hot management or future sharding Fully compatible with existing an embodiment client API. Customer won't need to change the code unless adopting new features.

Figure 6:
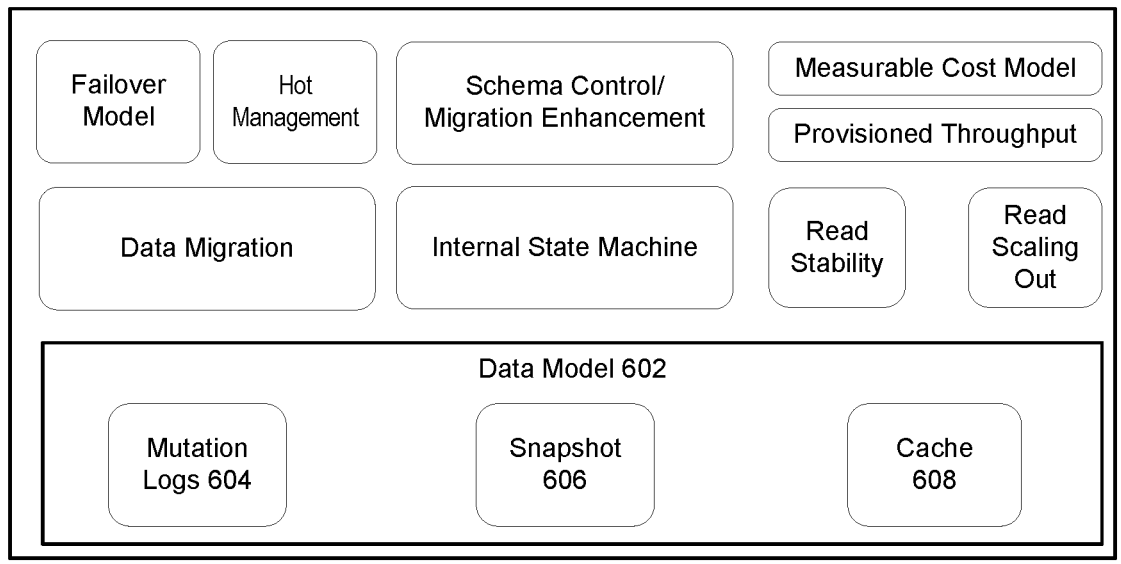
FIG. 6 depicts a block diagram illustrating an exemplary data model in accordance with at least some embodiments.

FIG. 6 depicts a block diagram illustrating an exemplary data model in accordance with at least some embodiments. The data model 802 is depicted as having three loose-coupled components.

1. Mutation logs 604 store all historical updates in given an embodiment store. It needs to be persisted in durable storage. Mutation log is used for replaying data store state during bootstrapping and disaster recovery.

2. A data store level snapshot 606 for reading. The snapshot stores all indexed data without historical versions, as of a given timestamp.

3. Tip of mutation logs stored in memory for read optimization (cache 608).

In this data model, any stored mutations, including an embodiment transaction write, will be persisted into mutation logs. A read will be performed on combination of the snapshot 606 and the cached tip of mutation logs (cache 608). In some embodiments, the three components are not coupled, which can be put into different places, and with necessary replications for durability, availability and throughput purposes.

Mutation logs 604 stores all MVCC histories on the data store. Any mutations that were persisted into the store will be appended to the mutation logs with a next LSN (Logical Sequence Number). Next LSN means the sequence number is monotonically increased.

In existing data models, mutation logs only contain transactions, and the data is scattered into multiple database tables, like KievTransactions, KievTransactionKeys, buckets, Kievindentities etc. It is coupled with a database because correctness of persistence relies on transactional writes across tables.

Mutation logs 604 in the new data model are more straightforward, which can be a streaming log. It has very simple structure with only 2 required fields: LSN (BigInteger) and PayLoad (CLOB). (Though one may add more fields with queryable information for operation or diagnostic purpose).

In some embodiments, mutation logs 804 are not in a critical data read path. It's only used for bootstrapping cache when an embodiment service started and disaster recovery. Thus below are preferred properties for mutation logs Highly Available Durable Append optimized writing Supports conditional write or lock (Safety for concurrent writers)

Supports fast deletion, partition or truncation

Seekable based on LSN

Sequential readable on LSN

A PDB is just a storage unit for storing mutation logs, which is not mapped to a particular customer. A single data stores mutation logs can be streamed into multiple PDBs, as long as each chunk is continued. A single PDB can accommodate multiple data stores' mutation logs so that we can compact cold customers together.

In certain embodiments, mutation logs are used instead of transaction logs, not only for a naming evolution, but also to extend concept with more mutation types rather than an embodiment transactions only. Here's list of possible mutations:

1. Customer data manipulation: mutations on customer bucket data change for given an embodiment transaction commit. This is the only type of mutations that is supported in current an embodiment.

2. Customer schema change: mutations on customer schema operations, e.g., create bucket, add column etc. This will be an important feature to improve an embodiment schema operation. We will discuss later.

3. System bucket mutations: system bucket acts the same with normal bucket, which can store data that track state of an embodiment internal operation. It's invisible to customer.

4. System command: an embodiment can design and persist commands to indicate a state change since given LSN, e.g., sealing the store, redirect or migrate store, etc. We will discuss this in following sections.

Appending a mutation log means a state change of an embodiment data store, which needs to be learned and may not be ignored when consuming and reading.

As mentioned above, mutation logs are not in a critical read path. In some embodiments, read is performed through a data store level consistent snapshot 606 plus cached mutation logs 608.

Snapshot 606 in embodiments stores a physical materialized view of the data store on a given LSN. Snapshot 606 only contains visible data as of the LSN. With support from an index, a read from snapshot 606 can be much simpler and predictable than reading from a versioned bucket. However, snapshot may be stale compared with a read LSN requested by a customer. To get a complete result set, a read can replay mutations stored in cache since the snapshot. Based on experimental data, database resources have been reduced by 50% after enabling 2 buckets with cached scan.

By way of illustration, consider an example read and write data flow in this data model 802. A write here means a mutation, which could be a transaction commit or a schema change command. It is very similar to current database transaction implementations. Any writes will land on the only leader transactor host. The leader transactor instance performs conflict detection with other in-flight or committed mutations in its cache, streaming it for asynchronized commit queue, until a final persistence to the data store.

A read can be done with an instance that holds mutation logs. A read, or scan request, lands to the host that stores cache for a given store. It perform reads from cache and snapshot respectively, and then combines them into a final result set to return. Data in cache and snapshot are all indexed, thus the read should be very fast, ideal to be O(log N), where N is size of rows. Read should not touch mutation logs in persist store, unless it needs to learn newer mutations per customer request.

In certain embodiments of the data model 602, it is possible to scale out read by provisioning more read resources:

1. It's possible to horizontally adding more cache hosts to improve read throughput
2. Naturally, an embodiment can leverage read only replicas of database cluster to fan out.
3. Given snapshot allows staleness, an embodiment can supply more asynchronized replicas on snapshot on customers demand.

Note: more cache hosts may require more tail operation on mutation log, which is not horizontally scalable. In practical, such tail operation is very simple and fast.

Schema change is also a subtle problem in existing models, which is not possible to be fixed in such a model. The source of this problem comes from two early design assumptions:

Non-versioned: any change on schema is not versioned, not repeatable, and not deterministic. This is anti-MVCC theory, makes it impossible to manage concurrency between data manipulation and schema change. There may be corruption bugs in a transactor when adding a column, and a customer has to pay attention to any schema change to avoid data corruption.

Relational table schema: the model relies on a lot of embedded schema features, potentially making it difficult to extend a schema change (e.g., remove nullable, change string length, etc).

In data model 602, any customer's schema changes are treated as a mutation on data store. A new log entry with assigned LSN will be appended for any customer schema change. This makes customer's schema update to be part of data plane. The data model 602 may be deterministic: concurrent data manipulation and schema change in client side will eventually be serialized in an embodiment side. A sample mutation log looks like below:

| LSN | Mutations |
|---|---|
| 1000 | CREATE BUCKET B1 WITH COLUMN C1, C2 |
| 1001 | INSERT INTO B1 VALUES C = 'Key', C2 = 'Val' |
| ... | ... |
| 1020 | DROP COLUMN C2 FROM B |
| 1021 | UPDATE B1 SET C1 = 'Key1' |
| ... | ... |
| 1040 | DROP BUCKET B1 |
| ... | ... |

Because bucket B1 is created as of LSN 1000, and dropped as of LSN 1040. it means:

Read on B1 under 1000 cannot be made (404) successfully because B1 is invisible.

Read or write against B1 after LSN 1040 will be rejected

Conflict can be detected if client uses a staled schema version (e.g., as of 1000) to read/write on a store has advanced to LSN 1021 (dropped column C2).

Since mutation logs contain a schema change, a replay of a data store becomes very deterministic at any point of LSN. This makes logical rollback in the data model 802 to be correct with a necessary schema rollback.

With the above concept, a schema in this data model 802 is treated as a view on top of data. Creation or dropping schema object only changes the way that the data is viewed, instead of doing any real data manipulation. A schema change can be interpreted as, as of given LSN, a customer decided to use another view to look at the data store. Most schema control is not a single step operation; it requires multiple steps, essentially a state machine, to complete. An Internal State Machine is presented on top of the mutation log below.

A lot of internal operations for customer requests, especially schema change, cannot be accomplished by a single atomic step. A typical example is adding an unique index:

1. In order to prevent poisoning data, an embodiment transactor needs to start to do uniqueness check when acknowledging the request
2. In background, an embodiment needs to verify constraint on existing data in bucket
3. an embodiment creates physical index on the bucket
4. an embodiment announce index creation completion.

Those steps may represent different states to indicate a checkpoint for proceeding, skipping, retrying and rolling back data. Those states may need deterministic order and timestamp to ensure the workflow can be processed correctly. On top of mutation log, with strong ordering guarantee, an embodiment can implement deterministic state machine or workflow engine to finish complex operations. In practical, an embodiment can introduce system bucket, which offers standard read and write application programming interfaces (APIs) as a customer bucket which is invisible to the customer. State machine metadata and execution can be stored in that system bucket, which may have a similar implementation-like workflow.

In some embodiments, some data control commands or configurations may be put into mutation logs, with benefit of monotonic versioning control. For example:

Seal Store command: indicate this an embodiment store has been sealed for writing, as of given LSN. This will be useful to mark store as read only before physically delete the store.

Redirect command: indicate the particular log chunk has been sealed, and readers/writers need to use next chunk specified in the command for continuously read/write operation.

With a redirect command, the data model can seamlessly migrate a data store to another location without any actual data movement. The data model can redirect writes and drop the expired mutation logs in old storage after a retention period.

Figure 7:
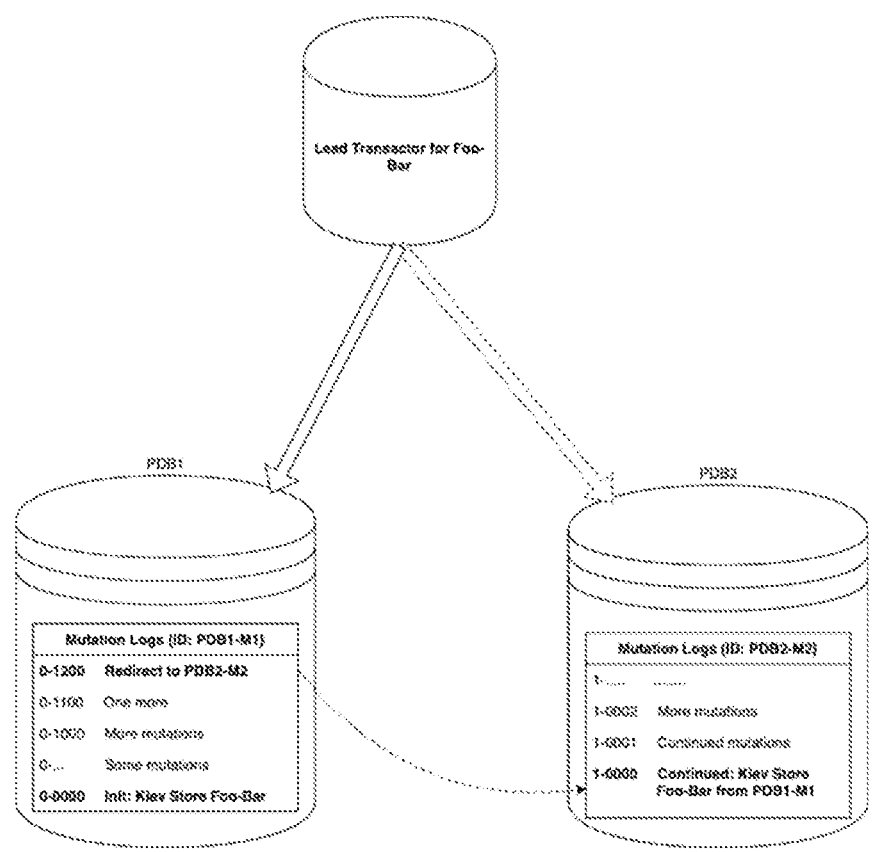
FIG. 7 depicts a diagram illustrating an example migration flow in accordance with at least some embodiments.

FIG. 7 depicts a diagram illustrating an example migration flow in accordance with at least some embodiments. For writes in the depicted data flow:

initial state, an embodiment transactor for Foo-Bar always append mutations to log chunk PDB1-M1.

At some point, due to any reason, lead transactor accepted a redirect request to another chosen PDB2, then:
Create a new mutation logs table, with ID PDB2-M2
Append mutation log to PDB1-M1: redirect to PDB2-M2
Initialize the mutation log by appending a new mutation: continued from PDB1-M1.
Lead transactor may append new mutations into PDB2-M2. PDB1-M1 is sealed.

When tailing mutation logs into memory, or performing disaster recovery, reader will start with PDB1-M1. It will learn next mutation storing in PDB2-M2 when getting redirect command for continued read.

Naturally, logs in PDB1-M1 will become old and eventually expired with more writes. Some embodiments do not need to retain PDB1-M1 after an aged snapshot is caught up, and the resource in PDB1 can be reclaimed. At this point, data migration of store Foo-Bar has been done from PDB1 to PDB2 without additional data movement. This data migration story will be helpful for seamless failover, hot management, and future sharding.

Additionally, described herein is a new failover model. Because a database doesn't guarantee high availability during failover, an embodiment currently experience outage on all PDBs on given CDB that is being patched. However, this impact can be mitigated by failover model in new data model.

Since a read relies on two components (cached logs and snapshot), a read can be done if both of them is available
In memory, cached logs for a given data store can be loaded into multiple hosts. Reconstructing and refreshing the cache is a simple operation done by tailing the mutation logs in a persisted store. Some embodiments may additionally ask a standby transactor to host cache for reading.
Snapshot can be replicated into multiple places.
A database model may have built-in replicas for availability in its standby for all data, so some embodiments can get 3 snapshots for free if it's stored in such a database.
Snapshots allows staleness, as long as there's no gap between cache and given snapshot. Some embodiments may store one or more asynchronized replicated snapshots in another storage place, e.g., another PDB for reading if main storage is down.

The data model may not be able to write any data due to current failover downtime when performing DB patching. The recovery time of DB, KaaS, application and business will be much longer than single PDB down time.

As discussed earlier, writes will be persisted in mutation logs, which is only used for disaster recovery or bootstrapping instead of critical path for reading. Under this condition, some embodiments may introduce a log migration mechanism to seamless migrate log writes.

In a normal situation, writes are continuously streaming to one storage unit, like PDB. A redirect operation can be done if we anticipate a failover:
1. append redirect command in to the log, to seal current mutation logs and redirect next write to another storage unit. Any further writes against this mutation logs should be rejected.
2. transactor will create new mutation logs in another storage unit and starting to write there.
3. When tailing the log, it should learn the redirection when reaching the redirect command and start next read from new location.
4. Some embodiments do not need mutation logs in old storage unit, which can be erased in the future, when LSN of aged snapshot is beyond redirect LSN.

It's also possible an embodiment can setup replication mutation logs into multiple PDBs: it could be synchronized, asynchronized with staleness SLA, or quorum protocol, if storage space and resource permitted. Transactor can failover itself to write to another replica if write to master failed.

In embodiments, garbage collection should be quite easy in the new data model.
1. Mutation Logs: mutations older than aged snapshot can be safely truncated without further scanning or identifying.
2. Snapshot: snapshot only stores latest version as of given LSN, so no garbage collection is needed.

In some embodiments, the data model uses KievTransactionId as LSN, which is generated by oracle sequence. KievTransactionId will not be increasing if migrating to another PDB. Broadly speaking, such localized SN cannot fit the requirement for future distributed migrations.

The new LSN should have the same bits as TransactionId is using (e.g., 64 bit Long). However some embodiments may extend it into an encoded number with 3 parts:
HighSN: this is the field which will increment if the mutation logs switches to another storage unit. Initially it will be zero. This guarantees any LSN in next storage unit will have a greater value than current one.
MiddleSN: this is field preserved to support cross PDB transaction, which may be retrieved from a global sequencer if necessary.
LowSN: this is the field for current KievTransactionId.

In some embodiments, one may deprecate the LSN generated by oracle sequence. In other embodiments, one may have a data model sequencer, maintained by a lead transactor.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
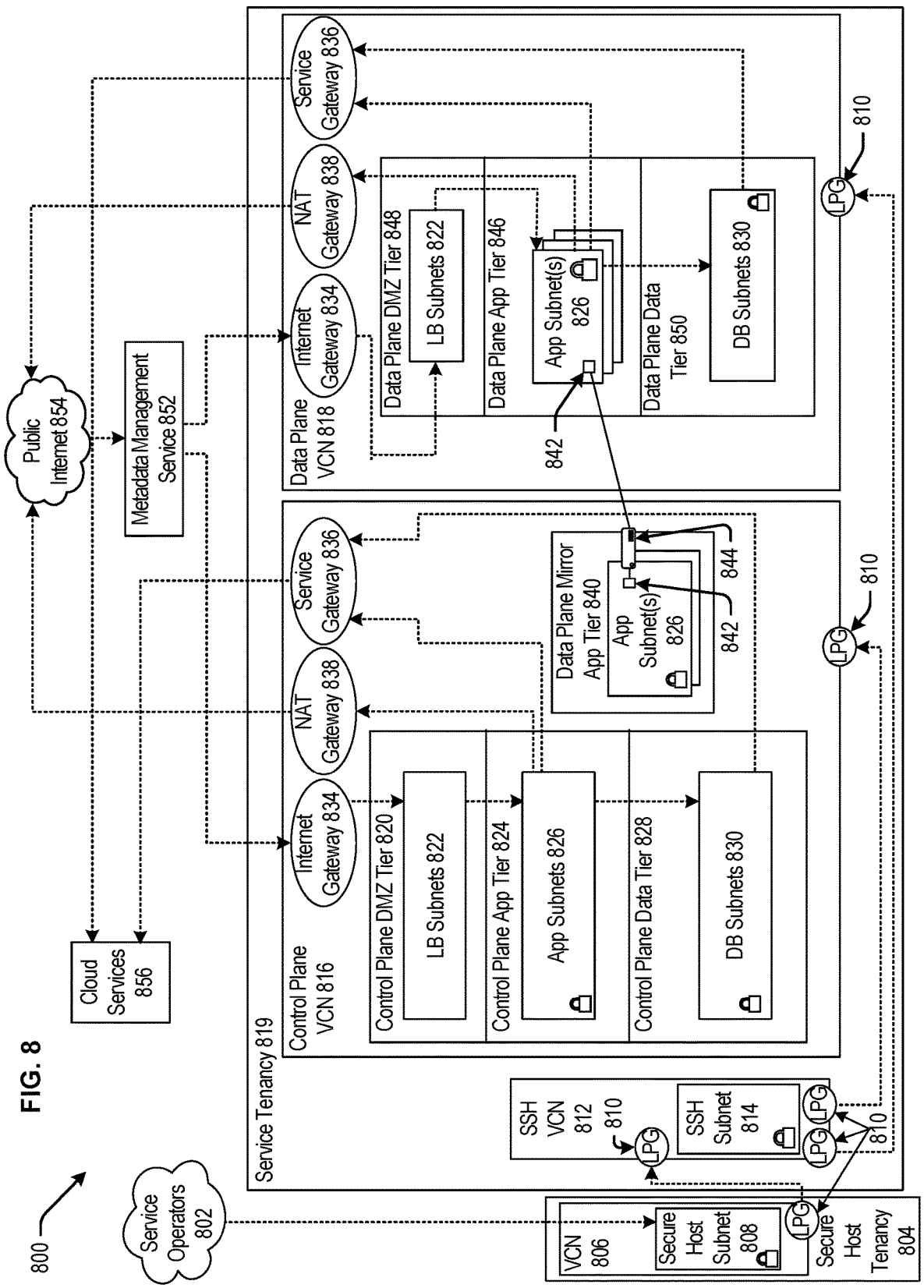
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
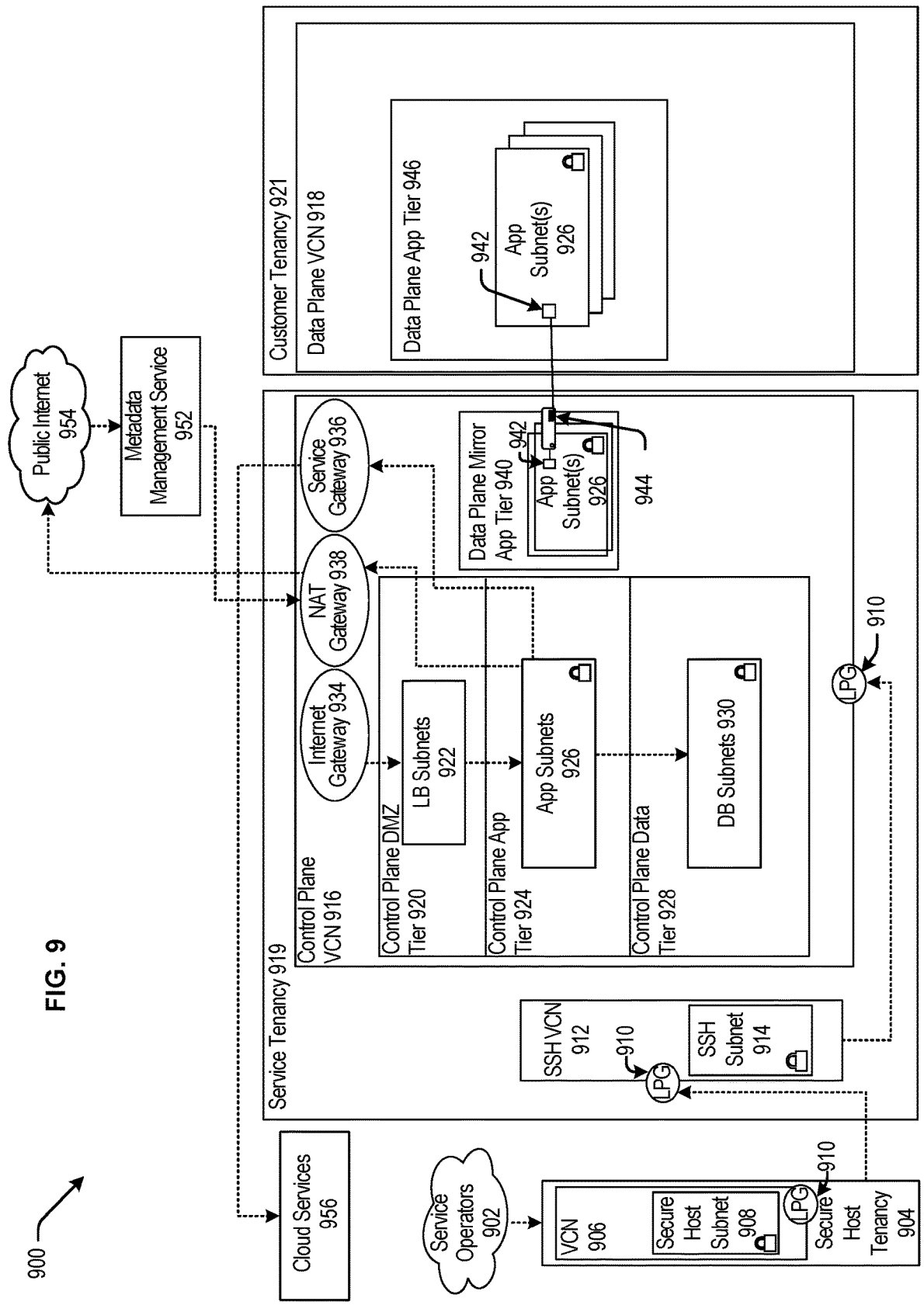
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
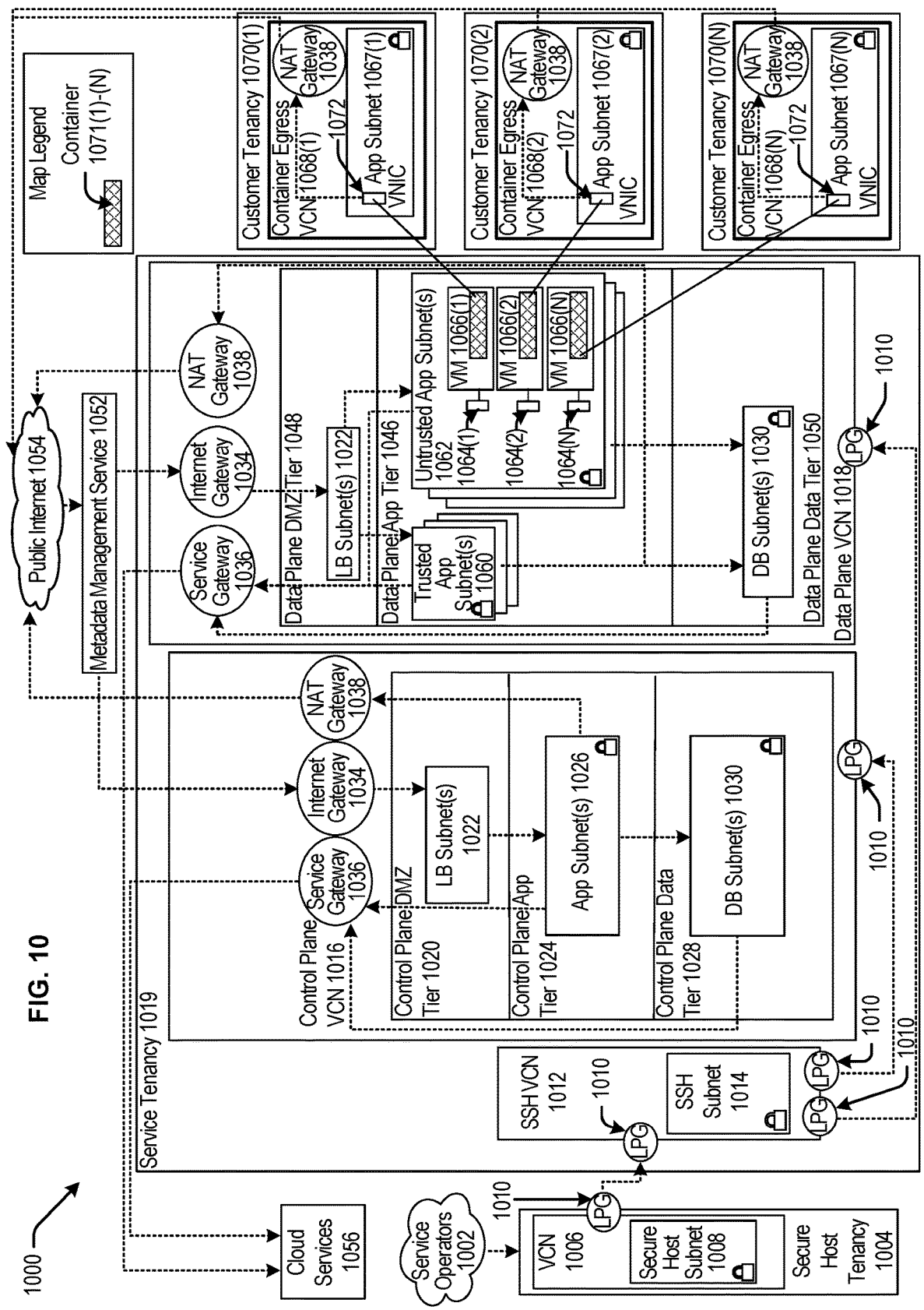
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
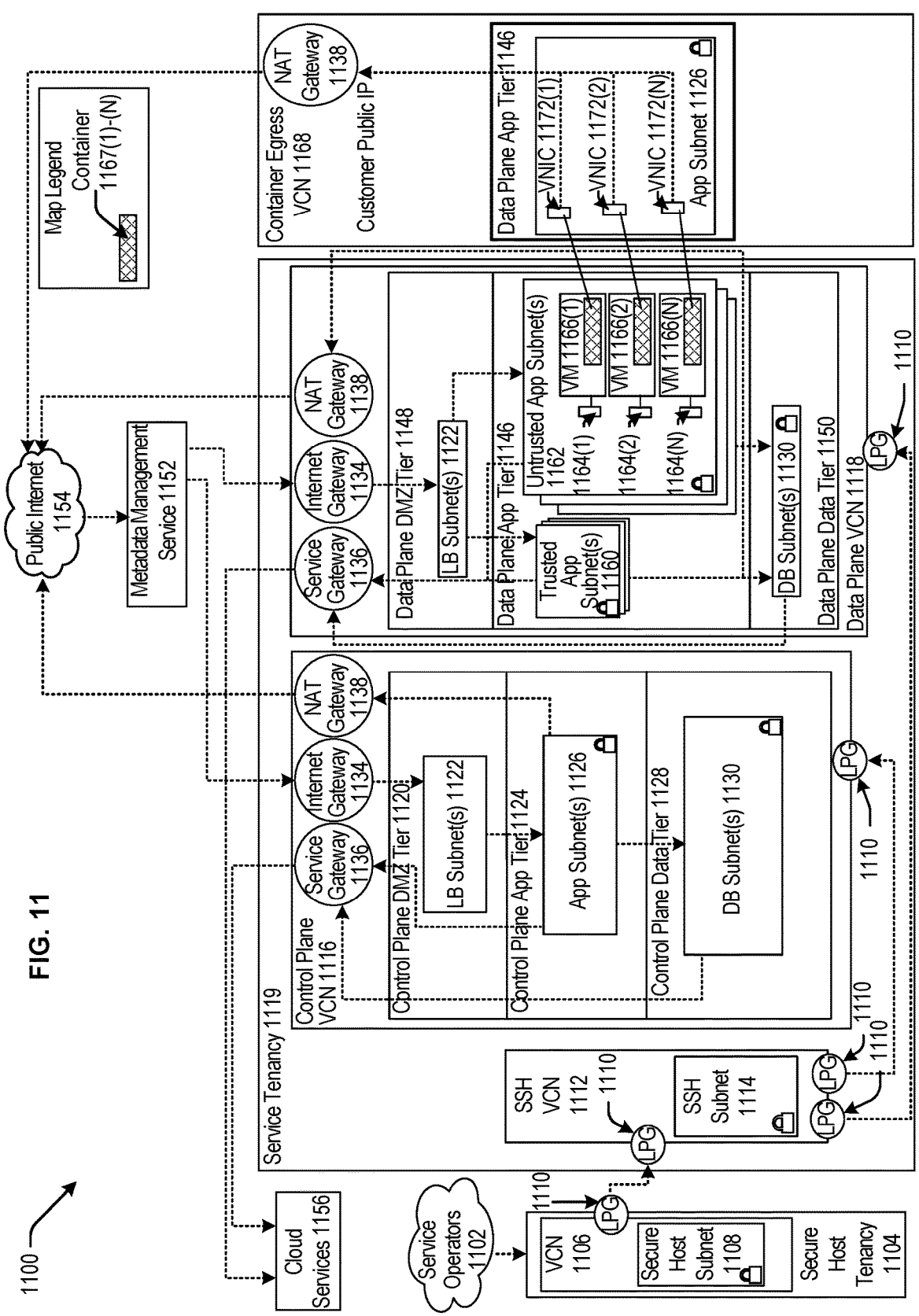
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
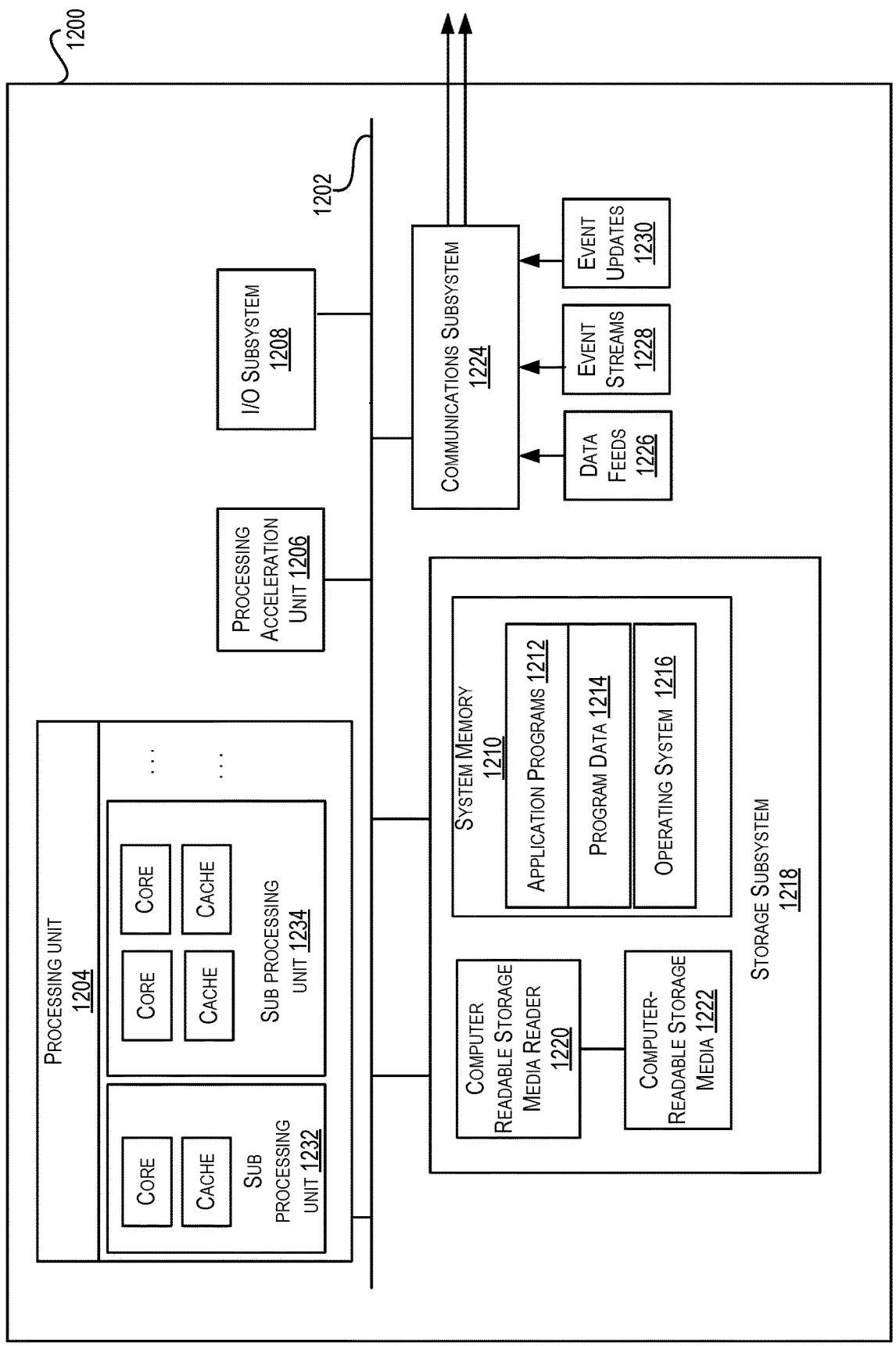
FIG. 12 is a block diagram illustrating an example computer system, according to at least one embodiment.

FIG. 12 illustrates an example computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination.

Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   determining, by a computing instance of a cloud platform, a transaction to be completed, the transaction comprising a set of operations;
   identifying, from the set of operations, a subset of client-managed operations and a subset of service-managed operations in a key-value data store implemented on the cloud platform, wherein the cloud platform is configured to maintain a list of service-managed operations and a list of client-managed operations, and wherein certain rows in a key-value store are client-managed rows and other rows are service-managed rows based on at least in part on a different type of data stored in the respective rows;
   performing each of the operations in the subset of client-managed operations;
   providing each of the operations in the subset of service-managed operations to a service application, wherein the service application performs each of the service-managed operations; and
   determining whether to commit the operations in the set of operations upon determining that all of the operations in the set of operations have been performed.

2. The method of claim 1, further comprising committing all of the operations of the set of operations in a single commit.

3. The method of claim 1, further comprising providing one or more conditions to the service application, wherein the operations in the set of operations are committed upon determining that each of the at least one of the one or more conditions have been met.

4. The method of claim 1, wherein each of the subset of service-managed operations are placed into a queue by the service application, the queue including service-managed operations received from a number of different computing instances.

5. The method of claim 4, wherein the service-managed operations in the queue are processed by the service application in an order in which the service-managed operations in the queue were received by the service application.

6. The method of claim 4, wherein the queue includes service-managed operations which impact a particular row of a data store.

7. The method of claim 1, wherein performing each of the operations in the subset of client-managed operations comprises updating at least one value in a data store.

8. The method of claim 7, wherein updating at least one value in the data store comprises:
   retrieving the at least one value from the data store;

generating an updated value from the at least one value based on the operation in the subset of client-managed operations; and writing the updated value back to the data store.

9. A computing device comprising:

a processor; and a memory including instructions that, when executed with the processor, cause the computing device to, at least:

determine, by a computing instance of a cloud platform, a transaction to be completed, the transaction comprising a set of operations;

identify, from the set of operations, a subset of client-managed operations and a subset of service-managed operations in a key-value data store implemented on the cloud platform, wherein the cloud platform is configured to maintain a list of service-managed operations and a list of client-managed operations, and wherein certain rows in a key-value store are client-managed rows and other rows are service-managed rows based at least in part on a different type of data stored in the respective rows;

perform each of the operations in the subset of client-managed operations;

provide each of the operations in the subset of service-managed operations to a service application, wherein the service application performs each of the service-managed operations; and determine whether to commit the operations in the set of operations upon determining that all of the operations in the set of operations have been performed.

10. The computing device of claim 9, wherein the computing device is one of a number of distributed computing devices in a cloud platform.

11. The computing device of claim 10, wherein the instructions are implemented as a cloud instance.

12. The computing device of claim 11, wherein the cloud instance includes a client application.

13. The computing device of claim 9, wherein the instructions further cause the computing device to, upon determining to commit the operations in the set of operations, commit all of the operations in the set of operations in a single commit.

14. The computing device of claim 9, wherein providing each of the operations in the subset of service-managed operations to the service application comprises providing a reference to a data value in a data store and an indication of one or more actions to be performed with respect to the data value.

15. The computing device of claim 14, wherein the data store is a key value store and the reference to the data value comprises a key identifier.

16. The computing device of claim 14, wherein the data value in the data store is not visible to the computing device.

17. The computing device of claim 9, wherein the service application retrieves and updates at least one uncommitted value when performing each of the service-managed operations.

18. A method comprising:

receiving, at a service application, a service-managed operation and at least one condition in a key-value data store implemented on a cloud platform, the service-managed operation comprising one of a number of operations for a transaction;

retrieving, by the service application, a data value associated with the service-managed operation from a data store;

manipulating, by the service application, the data value based on the service-managed operation;

determining, by the service application, whether the manipulated data value meets the at least one condition; and upon determining that the manipulated data value meets the at least one condition, writing the manipulated data value back to the data store, wherein the service-managed operation is not committed until all of the number of operations for the transaction are committed; and wherein the number of operations for the transaction also include at least one client-managed operation.

19. The method of claim 18, wherein the at least one condition includes a maximum or minimum value for the data value.

* * * * *